(12) United States Patent
Mehra

(10) Patent No.: US 8,825,902 B2
(45) Date of Patent: Sep. 2, 2014

(54) CONFIGURATION VALIDATION CHECKER

(75) Inventor: Pankaj Mehra, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3799 days.

(21) Appl. No.: 10/694,323

(22) Filed: Oct. 27, 2003

(65) Prior Publication Data

US 2005/0088979 A1    Apr. 28, 2005

(51) Int. Cl.
*G06F 15/173* (2006.01)
*H04L 12/56* (2006.01)

(52) U.S. Cl.
CPC ........... *H04L 45/22* (2013.01); *H04L 45/02* (2013.01); *H04L 49/15* (2013.01); *H04L 49/25* (2013.01)
USPC ................. 709/243; 709/220; 709/238

(58) Field of Classification Search
USPC ........................... 709/243, 220, 238
See application file for complete search history.

(56) References Cited

U.S. PATENT DOCUMENTS

| | | | |
|---|---|---|---|
| 6,907,470 B2 * | 6/2005 | Sawada et al. | 709/244 |
| 7,054,951 B1 * | 5/2006 | Kao et al. | 709/242 |
| 7,075,886 B2 * | 7/2006 | Futernik | 370/216 |
| 2002/0093954 A1 * | 7/2002 | Weil et al. | 370/389 |
| 2003/0046390 A1 * | 3/2003 | Ball et al. | 709/224 |
| 2004/0047336 A1 * | 3/2004 | Shabtay et al. | 370/351 |
| 2005/0036500 A1 * | 2/2005 | Rodeheffer et al. | 370/401 |

* cited by examiner

*Primary Examiner* — Liangche A Wang (57) ABSTRACT

A switch is provided which may include a plurality of ports, a plurality of link up/down detection logic units and a configuration validation checker. Each link up/down detection logic unit may be associated with a port and may detect a change in the state of a link associated with the port. The configuration validation checker couples to each of the link up/down detection logic units and may cause the switch to change its routing behavior with regard to a port for which a link up/down detection unit has detected a state change.

13 Claims, 4 Drawing Sheets

CONFIGURATION VALIDATION CHECKER

CROSS-REFERENCE TO RELATED APPLICATIONS

This disclosure may contain subject matter related to subject matter disclosed in an application entitled "Spontaneous Topology Discovery In A Multi-node Computer System," Ser. No. 10/375,495, filed Feb. 27, 2003, incorporated herein by reference.

BACKGROUND

Some computer networks may be configured as a plurality of entities coupled together with any one of a variety of infrastructures. For example, a network may comprise a plurality of "end nodes" on which applications run coupled to each other via one or more switches. Each switch may have multiple ports which can be used to connect to other switches and/or end nodes. Packets of data may be transferred through the network in accordance with a variety of protocols such as, and without limitation, source routing or destination routing via routing tables. Regardless of the protocol used to transfer data across the network, the topology of the network must be known. The term "topology" refers to the configuration of the network's entities, such as how the various ports on each switch and node are connected to ports on other switches and nodes.

It is possible for the network's topology to change. Such a change in topology may occur when a user connects additional equipment to the network, a port malfunctions, etc. In order to maintain the network operating in a sufficient manner, a mechanism typically is included in the network to detect a change in topology and determine the new topology. In accordance with one such mechanism, periodic "sweeps" are made during which each entity in the network is requested to provide topology information. Such information may be collected at a central point and from such information, a determination can be made as to whether a change in topology has occurred. Such a mechanism suffers from several disadvantages. For instance, because the aforementioned mechanism typically occurs at predetermined periods of time, topology changes will not be detected until the next scheduled sweep occurs. In the meantime, the network's management infrastructure may be unaware that a change in topology has occurred and, as a result, data packets may be mis-routed, lost, and/or cause undesirable network behavior (e.g., a system crash). The disclosed subject matter addressed one or more of the above issues.

SUMMARY

This disclosure provides methods and apparatus that address one or more of the issues noted above. In at least some embodiments, a switch may be provided that includes a plurality of ports, a plurality of link up/down detection logic units and a configuration validation checker. Each link up/down detection logic unit may be associated with a port and detects a change in the state of a link associated with the port. The configuration validation checker couples to each of the link up/down detection logic units and may cause the switch to change its routing behavior with regard to a port for which a link up/down detection unit has detected a state change.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "spontaneous discovery process" refers to a process of determining the topology or other configuration of a network without waiting for a periodic sweep through the network polling the network entities for changes in topology. That is, a change in topology initiates the onset of the discovery process.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
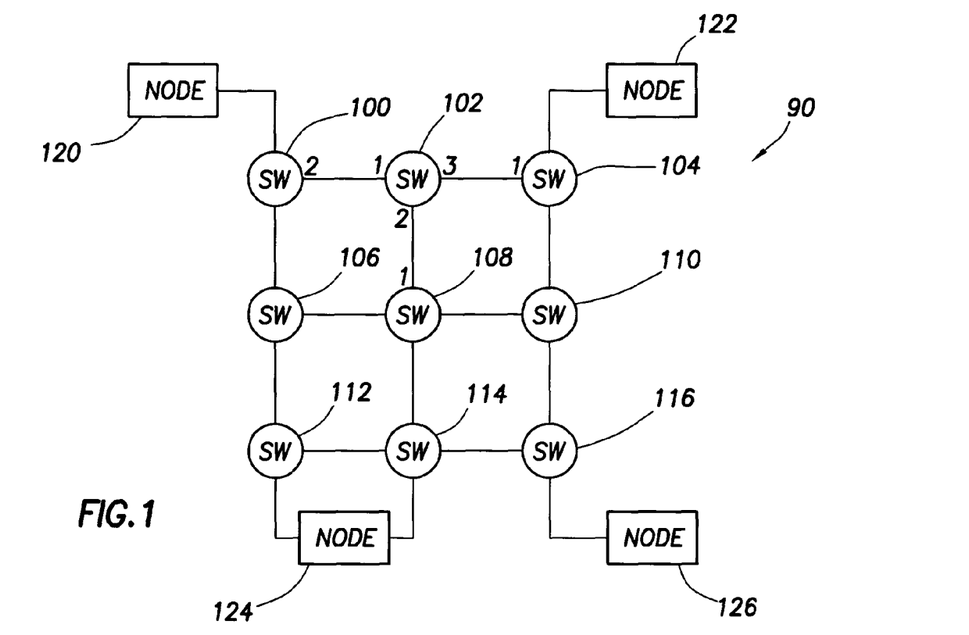
FIG. 1 shows an exemplary network in accordance with embodiments of the invention.

Referring now to FIG. 1, an electronic system 90 is shown in accordance with various embodiments of the invention. Electronic system 90 may comprise one or more switches 100-116 and one or more end nodes 120-126. Without limitation, electronic system 90 may comprise a computer system. The components shown in FIG. 1 may be arranged in a variety of configurations. In no way limiting the scope of this disclosure, the configuration shown in FIG. 1 includes switch 100 coupled to switches 102 and 106. Switch 102 coupled to switches 100, 104, and 108. Similarly, switch 104 couples to switches 102 and 110, switch 106 couples to switches 100, 108, and 112, switch 108 couples to switches 102, 106, 110, and 114, and switch 110 couples to switches 104, 108, and 116. Further, switch 112 couples to switches 106 and 114, switch 114 couples to switches 108, 112, and 116, and switch 116 couples to switches 110 and 114. Additional or different connections can also be made between the plurality of switches 100-116. Node 120 couples to the system via switch 100, while nodes 122 and 126 couple to switches 104 and 116 respectively. Node 124 is shown coupled to two switches 112 and 114. In general, an end node may couple to the system via one or more switches.

Via the plurality of inter-coupled switches, an end node 120-126 may communicate with another end node or a switch in the system. For example, node 120 may transmit data to any of the other nodes 122-126 or management information to one of the switches 100-116 possibly by going through one or more switches. One exemplary route for data to take between nodes 120 and 126 may comprise node 120, switch 100, switch 102, switch 108, switch 110, switch 116, and node 126. As should be apparent, in some cases more than one path may be available for a particular data or management packet to traverse the network between its source and destination. In general, any one of a variety of techniques may be implemented to permit the system to determine a suitable route for a packet to take through the plurality of switches. One such suitable techniques includes "source routing" in which the packet includes a series of output port numbers associated with the various switches through which the packet is intended to be routed. Another routing technique is destination routing in which the packet only includes a destination identifier but each switch on the path looks up a routing table in order to determine the output port through which to forward the packet.

Figure 2:
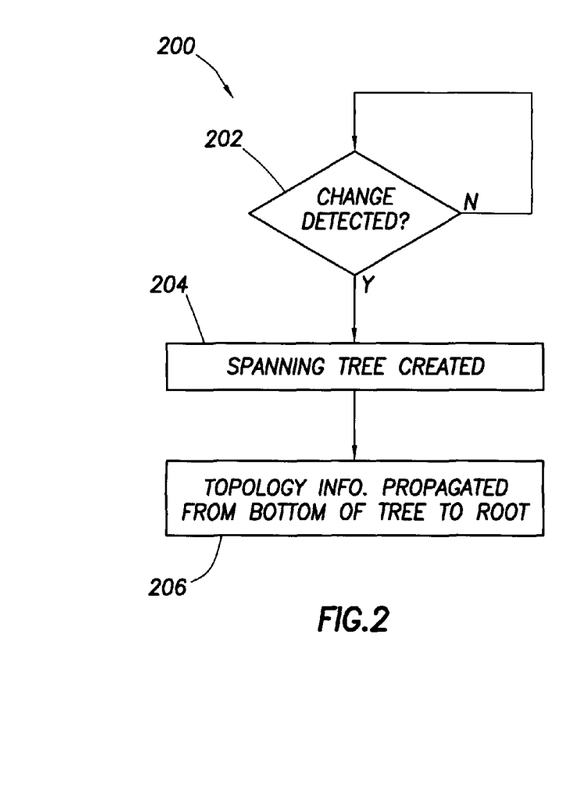
FIG. 2 shows an exemplary topology discovery process in accordance with embodiments of the invention.

In accordance with various embodiments of the present invention, spontaneous topology discovery is employed to facilitate a rapid detection and response to a change in network topology. Such topology changes may include, without limitation, a malfunction associated with a link between switches and/or between a switch and an end node. Further, a switch or a node may malfunction altogether bringing down multiple ports/links. An exemplary embodiment of a spontaneous topology discovery process is shown in FIG. 2 as process 200 and described below.

As shown, process 200 may comprise decision block 202 and blocks 204 and 206. In decision block 202, it is determined whether a change in the network topology has been detected. If so, control passes to block 204 in which a "spanning" tree is created, as will be described in more detail below with respect to FIG. 3. Once the spanning tree is created, new topology information is propagated from the bottom of the tree to the top, or "root" of the tree (block 206). Thus, the process 200 may be triggered by a detected change in topology and, as such, may occur spontaneously.

Figure 3:
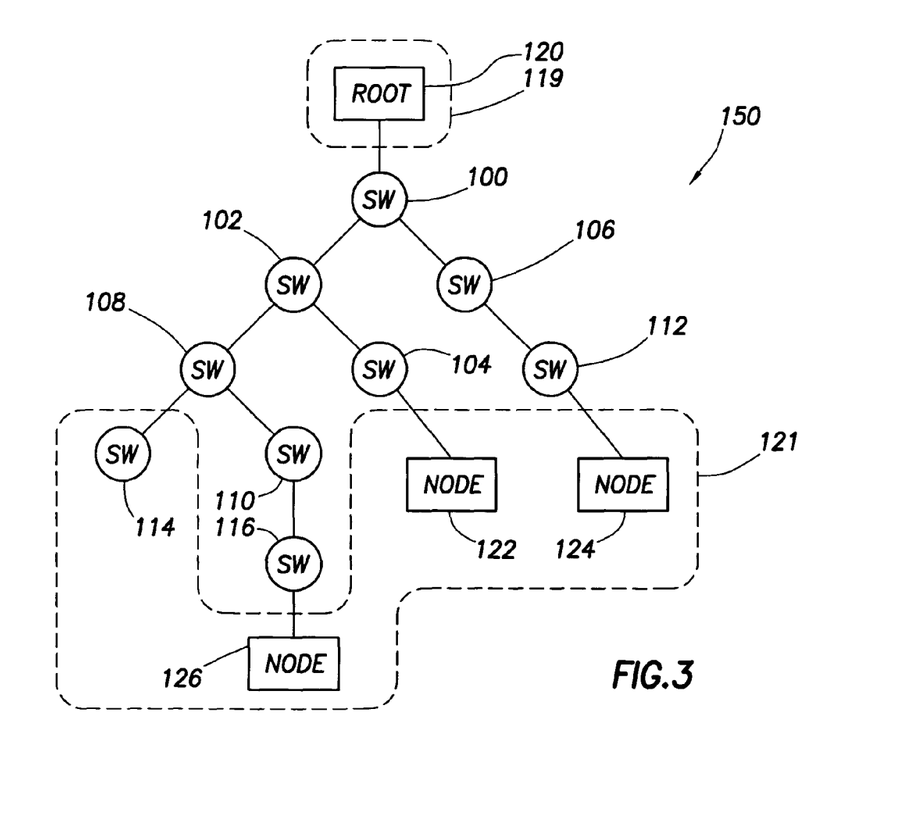
FIG. 3 shows an exemplary "spanning line" created according to the process of FIG. 2.

Referring now to FIG. 3, an exemplary embodiment of a spanning tree 150 is shown. The components shown in the spanning tree 150 of FIG. 3 represent the switches and nodes from FIG. 1 reorganized in accordance with an embodiment of the invention to permit spontaneous topology discovery. The root of the tree may comprise node 120 and is located at the "top" 119 of the tree 150. Each entity (e.g., switch or a node) may be a "parent" and/or a "child." For example, root 120 is a parent to one child, which is shown as switch 100. Switch 100 represents the child of parent 120 (the root) and also functions as a parent for children switches 102 and 106. Switch 106 represents the child of parent switch 100 and the parent of child switch 112. Switch 112, in turn, is the parent of child node 124. Similarly, switch 102 is the child of switch 100 and the parent to switches 108 and 104 which themselves are parents to switches 114, 110, and node 122, as shown. Further still, switch 110 is the parent to switch 116, which also is the parent of node 126. Entities 114, 126, 122 and 124 may be located at the "bottom" 121 of the tree 150. Other configurations for a spanning tree 150 based on the exemplary configuration of electronic system 90 in FIG. 1 are also possible besides that shown in FIG. 3.

Figure 4:
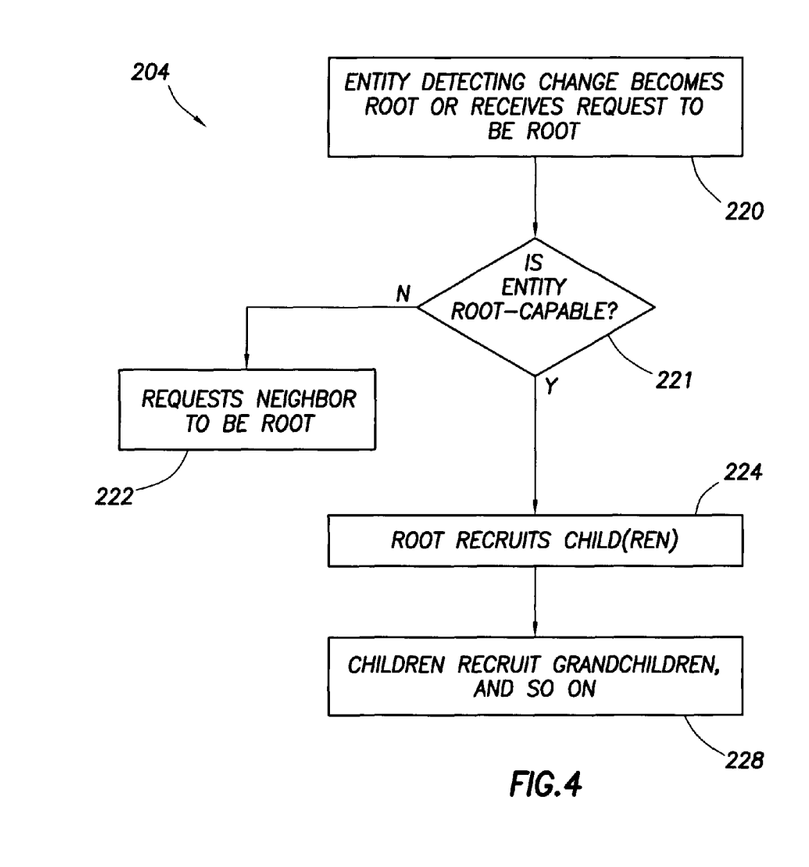
FIG. 4 provides more detail for the exemplary process of FIG. 2 in accordance with embodiments of the invention.

As explained above, block 204 in process 200 of FIG. 2 comprises creating a spanning tree, such as the exemplary spanning tree 150 of FIG. 3. Referring now to FIG. 4, an exemplary process for implementing the spanning tree created in block 204 is shown. In block 220, an entity, which may comprise a switch or a node, may either detect a change in the topology or receive a request from another neighboring entity to be the root of the spanning tree. As referred herein, the term "entity" refers to any component of the system 90 which may be part of the spanning tree 150, such as a switch or an end node. Further, the term "neighboring entity" or "neighbor" refers to an entity that has a direct communication link to an entity.

Referring briefly to FIG. 1 and by way of example, the neighbors of switch 108 include switches 102, 106, 110 and 114. An entity may detect a change in the topology, for example, by detecting that one of that entity's ports have malfunctioned or by detecting that the entity no longer has a functional communication link to its neighbor. Regardless of whether the entity detects the topology change itself, or another entity in the system detected the topology change and submitted a request to the entity to become the root, control passes to block 221. In block 221, the entity, which either detected the topology change or received the request to be root, determines whether it is capable of functioning as the root of the spanning tree. Determining whether the entity is root-capable may vary from application to application. In general, and without limitation, an entity may function as a root if it has sufficient resources, such as sufficient processing power and a sufficient amount of memory, to perform the actions described herein. If the entity determines that it is not root-capable, control passes to block 222 in which the entity may request that one of its neighbors become the root of the newly forming spanning tree. On the other hand, if the entity determines that it is root-capable, control passes to block 224 in which the entity (now termed the "root") may begin to recruit children for itself.

A root's child(ren) may comprise any one or more of the entities that are neighbors to the root. For example, in the spanning tree 150 of FIG. 3, root 120 was able to recruit one switch (switch 100) as its child. This was necessarily the case with respect to the exemplary embodiment of FIG. 3 because, referring to FIG. 1, node 120 only had one neighboring entity (switch 100) in the system 90. Once the root has recruited its children, control passes to block 228 in FIG. 4 in which the children begin to recruit grandchildren. That is, each child of the root attempts to become a parent for one or more other children entities in the system. Referring again to FIG. 3, root 120 recruited switch 100 as its child and switch 100 then recruited switches 102 and 106 as its children. The child recruitment process of block 228 (FIG. 4) may repeat itself until the spanning tree is fully formed. At that point, each entity in the network is aware of its parent, to the extent that it is not a root (which has no parent) and its child(ren), to the extent that it has a child. Each entity in the network, however, may not be aware of the full configuration for the spanning tree. Such knowledge is not necessary in the spontaneous topology discovery process described herein. Because each entity need not be aware of the complete network topology, each entity in the network need not have a large amount of memory for storage of such information. As such, the spontaneous topology discovery process described herein can be implemented with relatively little memory in each entity in the network.

Figure 5:
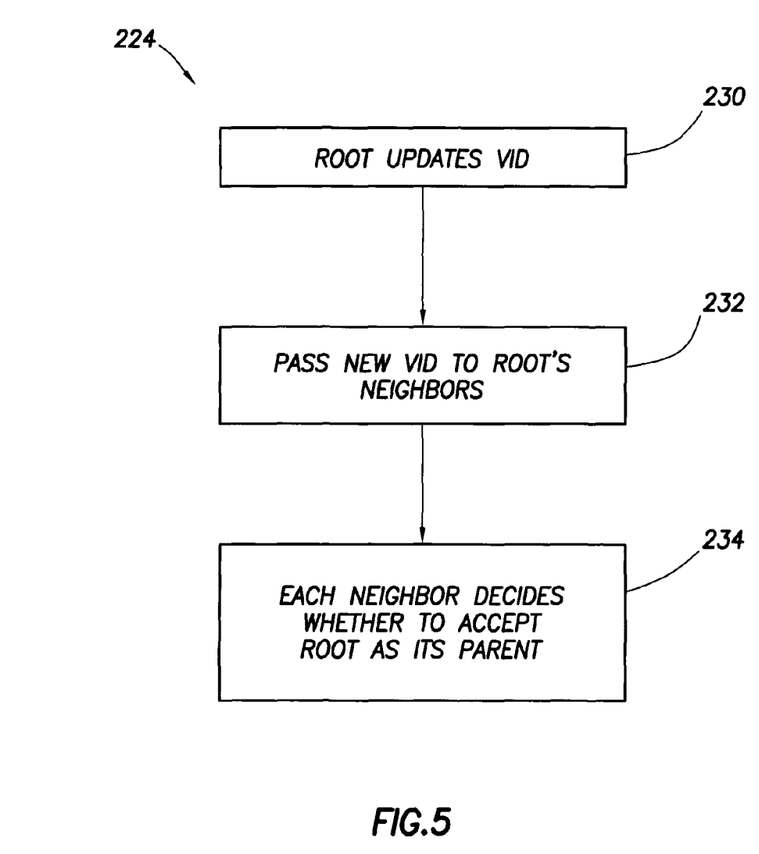
FIG. 5 provides more detail regarding the process of FIG. 4.

Referring now to FIG. 5, an exemplary embodiment of block 224 from FIG. 4 is shown. In block 224, as described above, the root may recruit children for itself. Referring to FIG. 5, process 224 may comprise blocks 230, 232, and 234. In block 230, the root updates its "view identifier" ("VID"). In accordance with some embodiments, the VID may comprise, without limitation, a view number and a unique identifier. Each entity in the network may include a unique identifier to uniquely differentiate that entity from all other entities. Each switch and end node port includes a unique identifier. A switch port identifier may be referred to as global unique identifier ("GUID") while an end node port may be referred to a ServerNet identifier ("SNID") in the context of a ServerNet product. For purposes of this disclosure, the identifiers associated with all switch and end node ports are referred to as GUIDs. The GUID referred to in block 230 represents the unique identifier of an entity in the network that has assigned the associated view number. The view number may comprise an arbitrary number that is incremented each time a change in network topology is detected. The VIDs may be included in a variety of packet types, but preferably are included in at least management packets (e.g., packets used to configure one or more entities in the network and to perform other management functions). Each entity in the network may retain a VID in memory in that entity. When an entity receives a management packet, the entity may compare the VID contained in the incoming packet to the VID previously stored in the entity. By comparing the two VIDs, the entity may determine whether another entity in the network has detected a change in network topology. That is, when an entity directly detects a change in network topology, the entity generates a management packet containing a VID that includes that entity's GUID and a VID number that is greater than the entity's previously used VID. In accordance with some embodiments, the entity may simply increment the previously used VID. If the previous VID contains a view number of "750," the entity detecting a topology change may increment the previous view number to 751 and include view number 751 in the next management packet.

Referring briefly to FIG. 4, in block 220 an entity may receive a request from a neighboring entity to become the root for the newly forming spanning tree. Also in block 224, the entity that has been selected as the root begins to recruit children for itself. Both actions may include the receipt of a management packet (block 220) or the transmission of a management packet (block 224) that comprises an updated VID. That is, an entity may receive a request from another entity to be a root in block 220. The entity receiving the incoming request may compare the VID embedded in the request to the current view retained by the entity. If the entity detects that the view has been updated, the entity determines that a topology change has occurred as detected by another entity in the network, and that the entity receiving the new VID is requested to become the new root.

Referring again to FIG. 5, the root may begin to recruit its children by updating its VID in block 230 to include a new view number and the GUID associated with the root. In block 232, via a management packet, the root may pass its newly updated VID to its neighbor. The management packet may request the neighbor to become a child of the root. In block 234, the neighbor may decide whether to accept the root as its parent. That decision may be based on one or more criteria. For example, the neighbor may have already been recruited as a child of another entity in the network, and, as such, may refuse to become the child of the root.

Figure 6:
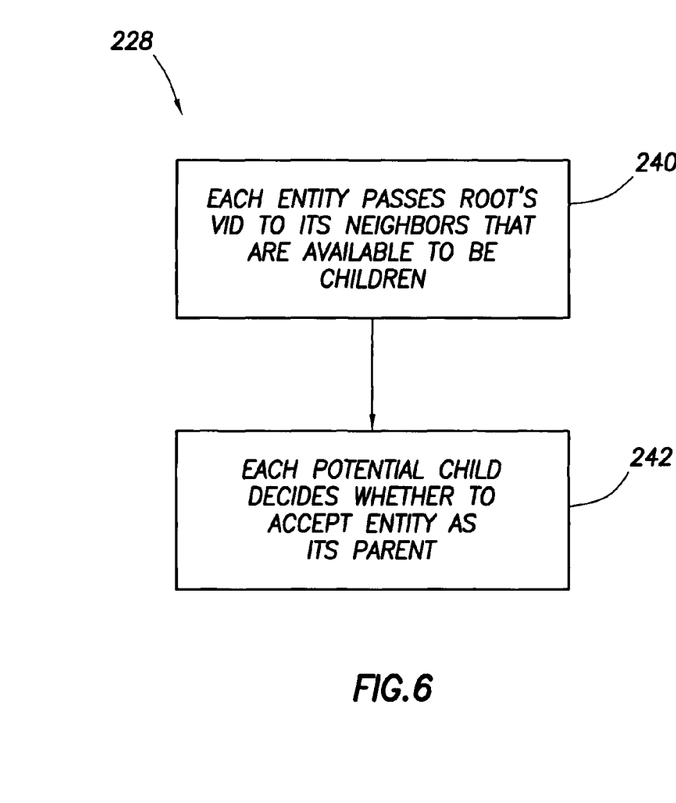
FIG. 6 also provides more detail regarding the process of FIG. 4.

Referring to FIG. 6, an exemplary implementation of block 228 from FIG. 4 is shown comprising blocks 240 and 242. In block 240, each entity may pass the root's VID to its neighbors (i.e., the neighbors of the entity referenced in block 240) that are still available to be recruited as children. In block 242, each potential child decides whether to accept the entity as its parent. This decision may be based on whether the potential child has already been recruited as a child in another portion of the presently forming spanning tree.

At this point, a spanning tree 150 has been created in furtherance of block 204 in FIG. 2. As explained previously, once the spanning tree is created, topology information may propagate from the bottom of the spanning tree to the root. An exemplary embodiment of this process is described below. Once the topology information is collected by the root, the root then knows the new topology of the network and may disseminate that information in accordance with the implementation of the network.

A variety of techniques may be employed to propagate topology information up through the spanning tree 150 to the root node 120. One suitable technique is as follows. Each entity in the system 100 is aware of its immediate neighbors, including its neighbor's identity and the port numbers through which the entity communicates with each neighbor. For example, referring briefly to FIG. 1, switch 102 is aware that it is coupled to switches 100, 104, and 108. As shown, port 1 on switch 102 couples to port 2 on switch 100, while ports 2 and 3 on switch 102 couple to port 1 on both switches 104 and 108. As such, switch 102 is aware that it has three neighbors and the port numbers used to interconnect switch 102 to the three neighbors. In accordance with an embodiment of the invention, each switch sends one or more messages up through its parent node in the spanning tree 150 toward the root node indicating the local topology surrounding that particular switch. To reduce network traffic, each such message must be acknowledged as being received by the parent before the entity can begin to propagate its next topology update message up toward the root. As such, a series of topology packets and associated acknowledgments occur by which the entities propagate their topology information up to the root.

The processes disclosed herein generally describe a topology discovery process that occurs spontaneously, that is, a process that is triggered upon detection of a change in topology. Further, the network can continue to be used to route normal data traffic while the discovery process is on-going. It should also be noted that topology changes are not the only events that can trigger the discovery process to occur. For example, changes in a service that runs on a particular node may cause a new round of discovery to occur. Such service changes may include the addition of a new service on to a node or switch, or the deletion or other alteration of a service from an entity. Further still, a user may add new equipment altogether to the network in the form of one or more switches and/or end nodes.

Figure 7:
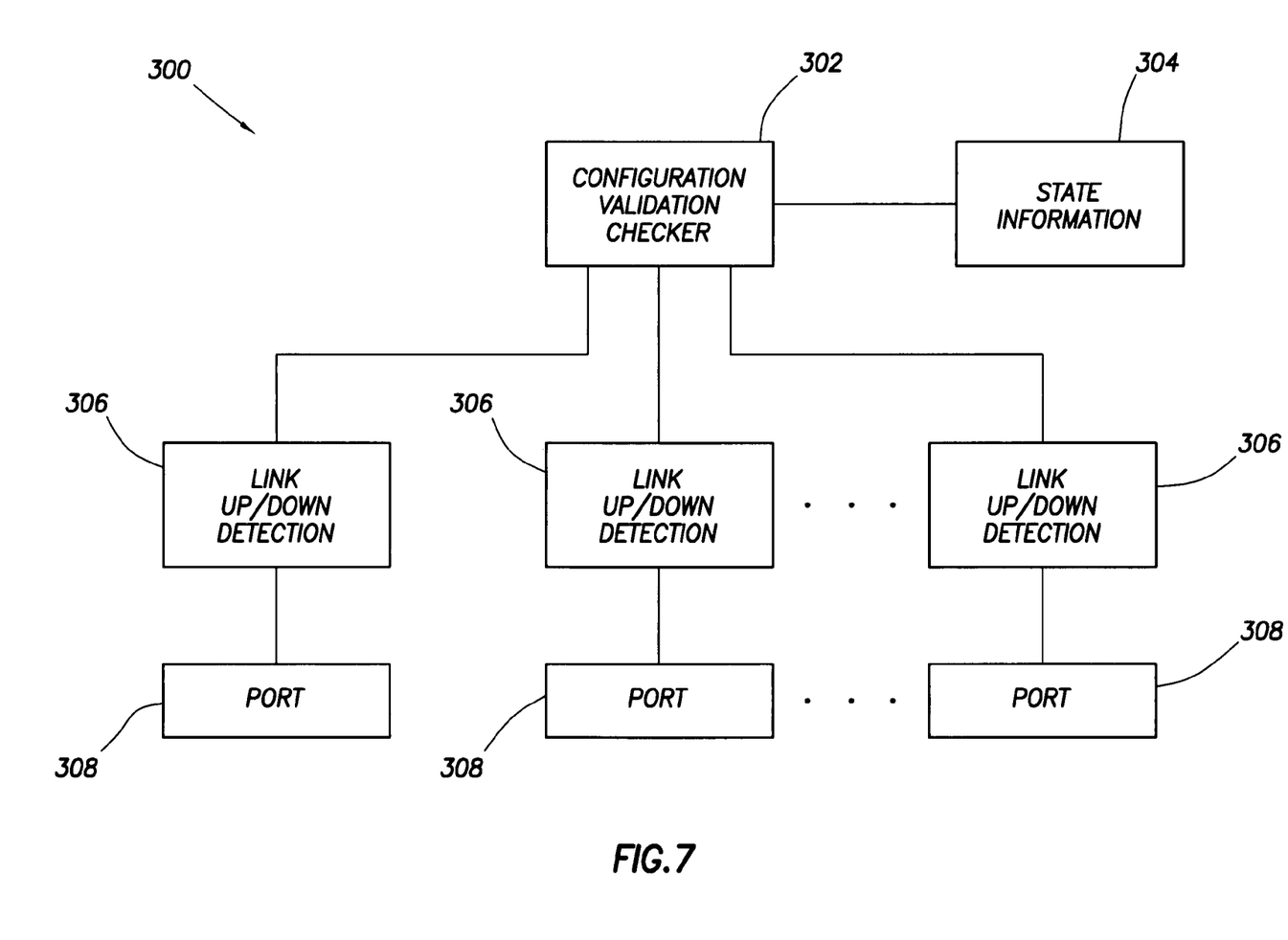
FIG. 7 shows an exemplary embodiment of a switch including a configuration validation checker.

FIG. 7 shows an exemplary embodiment a switch 300 which may be indicative of switches 100-116 in the system 90. As shown, switch 300 may include a configuration validation checker 302, state information 304, and link up/down detection logic 306 associated with each of a plurality of ports 308. As described above, each port 308 may be used to couple to a neighboring switch or to an end node. Each link up/down detection logic 306 may monitor its associated port 308 and detect when a connection from that port to a neighboring switch or node is no longer functional or when a new connection is established. An event in which a link becomes non-functional is referred to herein as a link "down" event. An event in which a link is newly established is referred to as a link "up" event. When a link up or down event occurs at a port 308, the associated link up/down detection logic 306 may assert a signal to the configuration validation checker indicating such an event.

The state information 304 generally includes information indicative of various aspects of the state of the system 90 in which the switch 300 resides. In accordance with some embodiments, the state information may include information related to the local topology pertaining to the switch. The local topology may include the unique identifiers (e.g., GUIDs) associated with the switch's neighbors. For example, referring briefly to FIG. 1, the state information for switch 100 may include the unique identifiers associated with the ports pertaining to end node 120 and switches 102 and 106 that couple to switch 100. In some embodiments, the state information may include a mapping between a GUID associated with a switch's port and a unique identifier (e.g., SNID) pertaining to an end node port that couples to the switch's port.

When a link up/down detection logic 306 detects a change in the associated link, be it an up event or a down event, the detection logic 306 may inform the configuration validation checker 302 of the event. The configuration validation checker 302 may respond in any one of a variety of manners. In some embodiments, the configuration validation checker 302 may cause the switch to reject, discard, or otherwise cease routing packets through the switch's ports even including, if desired, those ports unaffected by the detected up/down event.

In other embodiments, the configuration validation checker 302 may cause the switch to selectively discard packets wanting to pass through a subset of all of the switch's ports. For example, if one switch port experiences a link down, the configuration validation checker 302 may cause the switch to discard packets just through that one link (which is down). As such, if a packet enters the switch through a port 308 and the packet is to be routed out through another port that has been determined to be down, the configuration validation checker 302 may cause the switch's routing logic (not specifically shown) to prevent the packet from being routed out through the target port. Packets may continue to be routed out through other ports.

In some embodiments, an up link event may cause the configuration validation checker 302 to ascertain the unique identifier of the newly connected neighboring entity. To that end, the switch may submit a request to the newly connected neighbor for the new neighbor's unique identifier. The neighboring entity may provide the requested unique identifier via a responsive message. The configuration validation checker 302 may compare the unique identifier provided by the newly connected neighbor to the state information 304. If the new neighbor's unique identifier matches a unique identifier already stored in the state information 304 for the newly established link, the configuration validation checker 302 may cause the switch to route packets through the newly established link. This example may be indicative of a neighboring entity being removed and replaced with another entity programmed to have the same unique identifier as the previously removed entity. If, however, the unique identifier does not match an identifier contained in the state information, the configuration validation checker 302 may cause the switch to prevent the newly established link from being used to route packets until a new round of discovery is completed as explained previously.

In accordance with some embodiments, the configuration validation checker 302 may check a newly received topology resulting from the discovery process described previously. The configuration validation checker 302 may check the newly received topology to verify whether the topology comports with the switch's state information. The term "comport" refers to a process involving a variety of checks, such as examining whether new links have been added, vital links deleted, or a VID seen that is newer than one stored with the configuration validation checker's state information. If the new topology information comports with the state information, the configuration validation checker 302 permits the switch to use the new topology. If, however, the newly received topology does not comport with the switch's state information, the configuration validation checker 302 may mark all of the topology information, or at least the portion that is in conflict, as invalid and disable routing packets through ports associated with the disabled topology. The topology may remain invalid until either a new topology is provided to the switch that comports with the switch's state information or changes to state information bring the neighbor connections of the switch back into compliance with its stored topology.

In the embodiment described above, each switch 300 may include logic that permits the switch to rapidly, locally and autonomously determine an appropriate response to a link up or down event. Moreover, this avoids the necessity of having centralized management logic poll the network for changes and program a switch to function differently upon detection by the centralized logic of a link/up down event.

The configuration validation checker is especially useful when used in conjunction with computer end nodes having two or more network interfaces, each connecting into one of several independent switching fabrics. For instance, "rolling" changes made to the fabric of the system 90 may be facilitated by including a configuration validation checker 302 in each switch 300. As a switch is added to a fabric and new connections established and old connections taken down, each switch in the modified fabric will react appropriately to limit routing of packets. This behavior may cause some, and possibly all, of the paths between various node pairs connected through the fabric to experience timeouts on connections. The end node software, upon timing out, will switch the path to either a different fabric, a different network interface, or even a different path within the same fabric. This feature will allow all, or part, of the routing state information on the switches in the affected fabric to be updated without impacting end-to-end connectivity. Once the updated fabric stabilizes, the configuration changes could likewise be applied to another fabric, thus allowing a network to undergo what is known as a "rolling upgrade."

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A switch, comprising:
 a plurality of ports;
  a plurality of link up/down detection logic units, each link up/down detection logic unit associated with a port and configured to detect a change in the state of a link associated with the port; and
  a configuration validation checker coupled to each of the link up/down detection logic units, said configuration validation checker causes the switch to change its routing behavior with regard to a port for which a link up/down detection unit has detected a state change;
  wherein the configuration validation checker receives topology information from an entity external to the switch and prevents said topology information from being used by the switch for routing purposes if the topology information fails to comport with local topology information stored in the switch.

2. The switch of claim 1 wherein each link up/down detection logic unit informs the configuration validation checker when a link to an associated port becomes non-functional, and the configuration validation checker responds by discarding all packets.

3. The switch of claim 1 wherein each link up/down detection logic unit informs the configuration validation checker when a link to an associated port becomes non-functional, and the configuration validation checker responds by discarding all packets destined to that link.

4. The switch of claim 1 wherein each link up/down detection logic unit informs the configuration validation checker when a non-functional link to an associated port becomes functional, and the configuration validation checker responds by:
   receiving an identifier value from another entity coupled to the switch via the functional link;
   comparing the identifier value received from the another entity with said local topology information contained in the switch;
   if the identifier value matches a value in the local topology information, permitting the switch to route packets over the functional link; and
   if the identifier value does not match a value in the local topology information, discarding all packets targeting the functional link.

5. A switch, comprising:
   a plurality of ports;
   a plurality of link up/down detection logic units, each link up/down detection logic unit associated with a port and adapted to detect a change in the state of a link associated with the port;
   means for causing the switch to change its routing behavior with regard to a port for which a link up/down detection unit has detected a state change; and
   means for receiving topology information from an entity external to the switch and for preventing said topology information from being used by the switch for routing purposes if the received topology information fails to comport with local topology information stored in the switch.

6. The switch of claim 5 further including means for ceasing routing of all packets destined to said link.

7. A network, comprising:
   a plurality of switches coupled together; and
   at least one end node coupled to at least one switch;
   wherein at least one switch includes:
   a link up/down detection logic associated with a port and configured to detect a change in the state of the link; and
   a configuration validation checker coupled to the link up/down detection logic, said configuration validation checker causes the switch to change its routing behavior with regard to the port if the link up/down detection logic has detected a state change; and
   wherein the configuration validation checker is receive topology information from an entity external to the at least one switch and to prevent said topology information from being used by the at least one switch for routing purposes if the topology information fails to comport with local topology information stored in the at least one switch.

8. The network of claim 7 wherein the link up/down detection logic unit informs the configuration validation checker when the link becomes non-functional, and the configuration validation checker responds by rejecting all packets.

9. A method performed by a switch contained in a system, comprising:
   the switch monitoring a port for a link down event or a link up event, said link down event indicative of a link from the switch to an entity external to the switch becoming non-functional and said link up event indicative of a newly established link from the switch to said entity;
   the switch detecting a link down event associated with said switch or a link up event associated with said switch;
   receiving a packet into said switch;
   the switch determining if said packet is to be routed out through said port associated with the detected link down event or link up event;
   if the switch determines that the packet is to be routed out through said port associated with a detected link down event, the switch discarding the packet; and
   if the switch determines that the packet is to be routed out through said port associated with a detected link up event, the switch routing the packet through said port; and
   receiving topology information from the entity and preventing said topology information from being used by the switch for routing purposes if the topology information fails to comport with local topology information stored in the switch.

10. The method of claim 9 further including if the switch determines that the packet is to be routed out through said port associated with a detected link down event, discarding all packets received by the switch.

11. The method of claim 9 further including requesting the entity to provide a unique identifier to the switch.

12. The method of claim 11 further including the switch receiving a unique identifier from the entity, comparing the unique identifier received from the entity to state information contained in the switch and, if the unique identifier from the entity does not match a value in the state information, discarding a packet destined for the entity.

13. The method of claim 12 wherein further including if the unique identifier from the entity matches a value in the state information, permitting packets destined for the entity to be routed from the switch to the entity.

* * * * *

UNITED STATES PATENT AND TRADEMARK OFFICE
CERTIFICATE OF CORRECTION

PATENT NO. : 8,825,902 B2  
APPLICATION NO. : 10/694323  
DATED : September 2, 2014  
INVENTOR(S) : Pankaj Mehra

Page 1 of 1

It is certified that error appears in the above-identified patent and that said Letters Patent is hereby corrected as shown below:

In the Claims

In column 10, line 4, in Claim 7, delete "is receive" and insert -- receives --, therefor.

Signed and Sealed this
Thirteenth Day of January, 2015

Michelle K. Lee
*Deputy Director of the United States Patent and Trademark Office*